(12) United States Patent
Chubbuck (10) Patent No.: US 9,840,298 B2
(45) Date of Patent: Dec. 12, 2017

(54) BICYCLE WITH BOTTOM BRACKET CABLE GUIDE

(75) Inventor: Kyle L. Chubbuck, San Jose, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 1208 days.

(21) Appl. No.: 13/076,015

(22) Filed: Mar. 30, 2011

(65) Prior Publication Data

US 2012/0247263 A1   Oct. 4, 2012

(51) Int. Cl.
| | |
|---|---|
| F16C 1/22 | (2006.01) |
| B62J 99/00 | (2009.01) |
| B62K 19/30 | (2006.01) |
| B62L 3/02 | (2006.01) |
| B60T 11/04 | (2006.01) |

(52) U.S. Cl.
CPC ............ *B62J 99/00* (2013.01); *B60T 11/046* (2013.01); *B62K 19/30* (2013.01); *B62L 3/02* (2013.01); *B62J 2099/0046* (2013.01); *Y10T 74/20462* (2015.01)

(58) Field of Classification Search
USPC ...................... 74/502.6; 385/56, 76; 254/389
See application file for complete search history.

(56) References Cited

U.S. PATENT DOCUMENTS

| | | | |
|---|---|---|---|
| 3,830,115 A * | 8/1974 | Juy | 74/502.6 |
| 4,156,373 A * | 5/1979 | Juy | 74/502.6 |
| 4,305,712 A | 12/1981 | Nagano | |
| 4,325,269 A | 4/1982 | Nagano | |
| 4,733,835 A | 3/1988 | Schlanger et al. | |
| 4,768,798 A | 9/1988 | Reed et al. | |
| 4,900,291 A | 2/1990 | Patterson | |
| 4,915,404 A * | 4/1990 | Chonan | 280/288.3 |
| 4,938,733 A | 7/1990 | Patterson | |
| 5,102,372 A | 4/1992 | Patterson et al. | |
| 5,433,465 A | 7/1995 | Klein et al. | |
| 5,478,100 A | 12/1995 | McDermitt, Jr. et al. | |
| 6,330,989 B1 | 12/2001 | Okamoto | |
| 6,354,545 B1 * | 3/2002 | Liao | 248/214 |
| 6,725,978 B2 * | 4/2004 | Karpowich | 188/20 |
| 7,340,976 B2 | 3/2008 | Tetsuka | |
| 7,540,217 B2 * | 6/2009 | Ueno | 74/502.6 |
| 7,566,065 B2 | 7/2009 | Fukui | |
| 7,922,612 B2 * | 4/2011 | Yoshida et al. | 474/80 |
| 2003/0022743 A1 * | 1/2003 | Meggiolan | 474/70 |
| 2006/0022425 A1 * | 2/2006 | Nishimoto | 280/260 |
| 2006/0232041 A1 | 10/2006 | Chen | |

* cited by examiner

*Primary Examiner* — Vicky A Johnson
(74) *Attorney, Agent, or Firm* — Michael Best & Friedrich LLP (57) ABSTRACT

A cable guide for a bicycle including a frame that has a bottom bracket. The cable guide includes a first guide that is attachable to the frame adjacent the bottom bracket and that supports a first cable, and a second guide that is attachable to the frame adjacent the bottom bracket and that supports a second cable. The first guide includes a first cable conduit that extends into the frame at a first angle, and the second guide includes a second cable conduit that extends into the frame at a second angle different from the first angle.

15 Claims, 7 Drawing Sheets

BICYCLE WITH BOTTOM BRACKET CABLE GUIDE

BACKGROUND

The present invention relates to bicycles, and more particularly to a cable guide for bicycles.

Bicycles typically include cables that control braking, as well as front derailleurs and rear derailleurs associated with front and rear sprocket assemblies, respectively. Frequently, the cables are routed from the handlebars through or on the frame of the bicycle to the respective brakes or derailleurs.

Cable guides are often used to secure the cables to the frame. For example, cable guides for derailleur cables can be attached to the frame adjacent a bottom bracket of the frame to hold the cables against the frame near the pedals, to avoid interference from the pedals, and to provide smooth, low-friction movement of the cable. Existing bottom bracket cable guides are typically one-piece guides that hold the front and rear derailleur cables to the frame.

SUMMARY

The present invention provides a cable guide for a bicycle including a frame that has a bottom bracket. The cable guide includes a first guide that is attachable to the frame adjacent the bottom bracket and that supports a first cable, and a second guide that is attachable to the frame adjacent the bottom bracket and that supports a second cable. The first guide includes a first cable conduit that extends into the frame at a first angle, and the second guide includes a second cable conduit that extends into the frame at a second angle different from the first angle.

In another construction, the cable guide includes a first guide that supports a first cable, and a second guide that supports a second cable. The first guide and the second guide are separable from each other and are attachable to the frame adjacent the bottom bracket by a single fastener.

In another construction, the cable guide includes a first guide that supports a first cable and in that defines a first arcuate recess along an edge of the first guide, and a second guide that supports a second cable and that defines a second arcuate recess along an edge of the second guide. The first guide and the second guide are positioned to contact each other on the frame such that the first arcuate recess is aligned with the second arcuate recess to form a hole. The cable guide also includes a fastener extending through the hole to attach the first guide and the second guide to the frame adjacent the bottom bracket.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
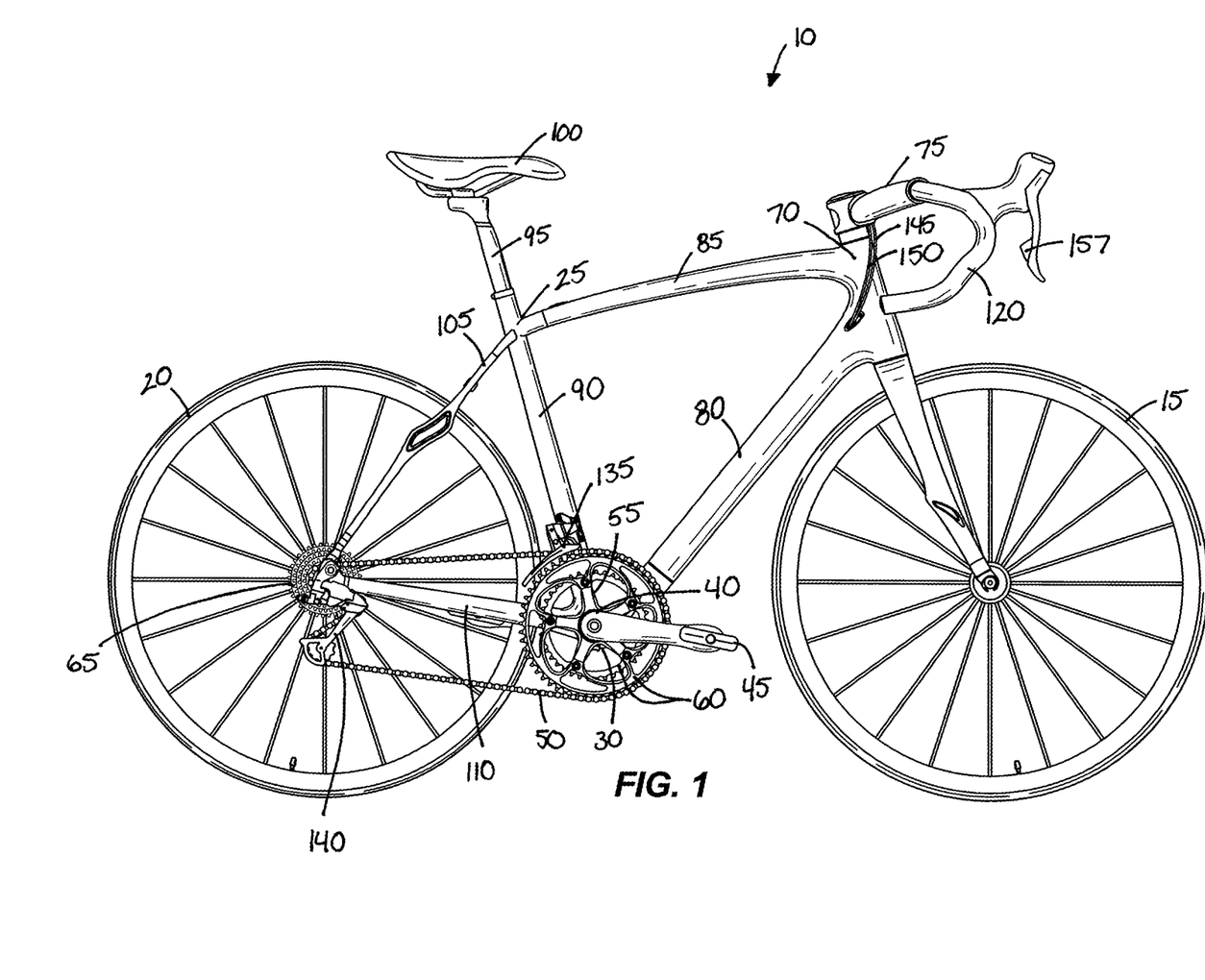
FIG. 1 is a side view of a bicycle embodying the present invention.
Figure 2:
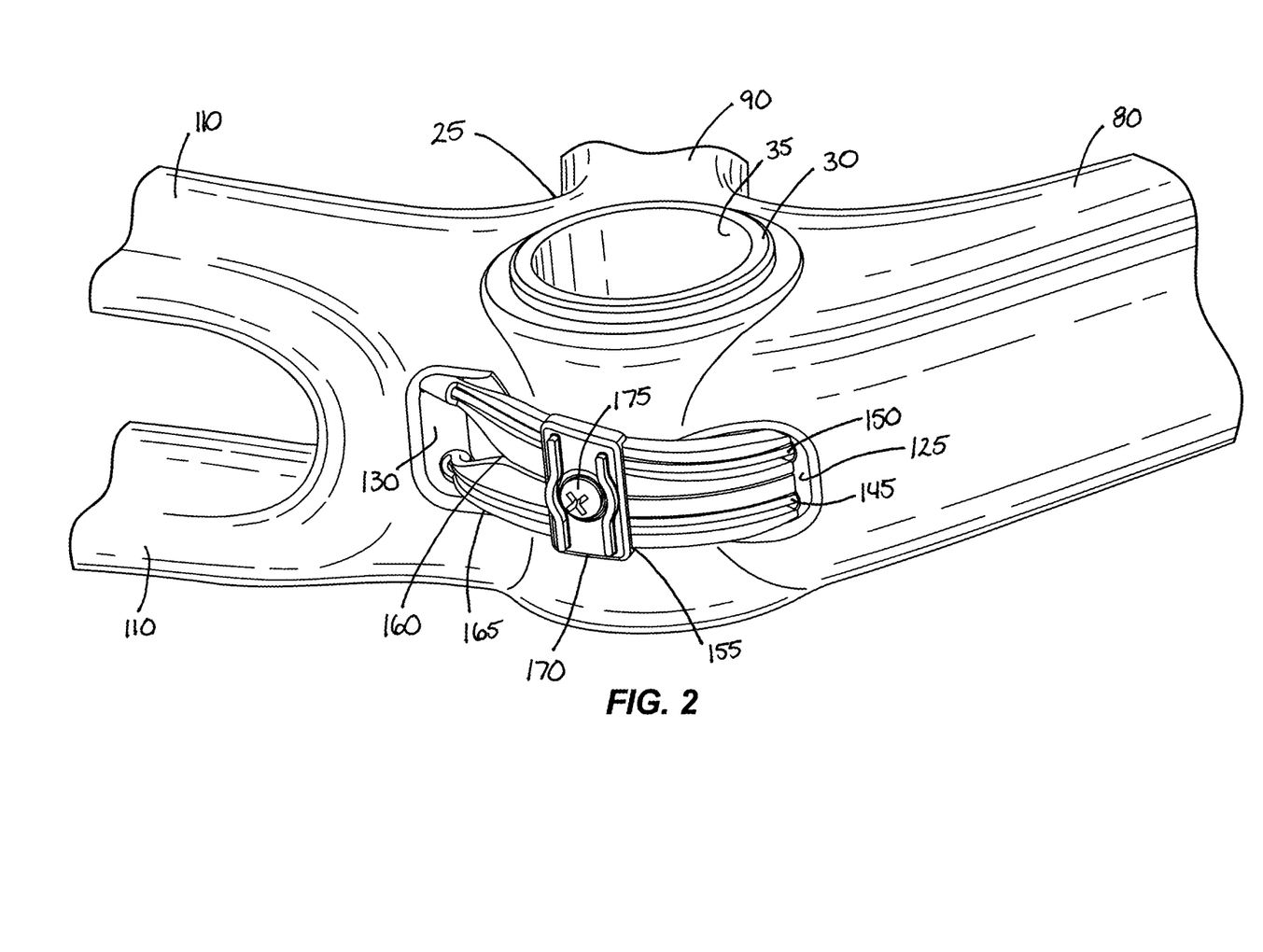
FIG. 2 is a perspective view of a frame and a bottom bracket cable guide of the bicycle of FIG. 1.

FIGS. 1 and 2 show a bicycle 10 that includes a front wheel 15, a rear wheel 20, and a frame 25. The frame 25 includes a bottom bracket 30 defining an opening 35 that receives a bottom bracket shell (not shown) and a crankset 40. The illustrated frame 25 is formed from a carbon material or other similar materials with adequate strength properties. With reference to FIG. 1, pedals 45 are attached to the crankset 40 to allow a user to rotate the crankset 40 and propel the bicycle 10 by a chain 50, as is known in the art. A front sprocket assembly 55 is coupled to the crankset 40 and includes two or more chain rings 60 that couple to the chain 50. The chain 50 engages the rear wheel 20 through one of a series of rear sprockets 65 that are coupled to an axle (not shown) the rear wheel 20.

The illustrated frame 25 further includes a head tube 70, a steering assembly 75 coupled to the head tube 70, a down tube 80, a top tube 85, a seat tube 90, a seat post 95 coupled to the seat tube 90 for supporting a rider on a seat 100, seat stays 105 that support the seat post 95, and chain stays 110 that support the rear wheel 20. The steering assembly 75 includes a front fork 115 and handlebars 120 that are coupled to the front fork 115 such that the handlebars 120 are rotatable by the rider to rotate the front fork 115 and the front wheel 15.

The down tube 80 extends from the head tube 70 generally downward and rearward to the bottom bracket 30. As shown in FIG. 2, the down tube 80 includes a first cable access area 125 adjacent and on one side of the bottom bracket 30 (the forward side of the bottom bracket 30 as viewed in FIGS. 1 and 2). The top tube 85 is located above the down tube 80 and extends from the head tube 70 rearward to the seat tube 90. The seat tube 90 extends generally upward from the bottom bracket 30 to interconnect the top tube 85 and the down tube 80. As illustrated, the seat tube 90 is directly coupled (e.g., welded) to the top tube 85 and supports the seat.

The seat stays 105 extend generally downward along sides of the rear wheel 20 and assist with coupling the rear wheel 20 to the frame 25. The chain stays 110 connect to the bottom of the seat tube 90 and extend rearward on both sides of the rear wheel 20. As shown in FIG. 2, the chain stays 110 include a second cable access area 130 located adjacent and on a side of the bottom bracket 30 (the rearward side of the bottom bracket 30 as viewed in FIGS. 1 and 2). The seat stays 105 and the chain stays 110 cooperate with one another to support the rear wheel 20 such that the wheel 20 can rotate about the axle and propel the bicycle 10.

Figure 7:
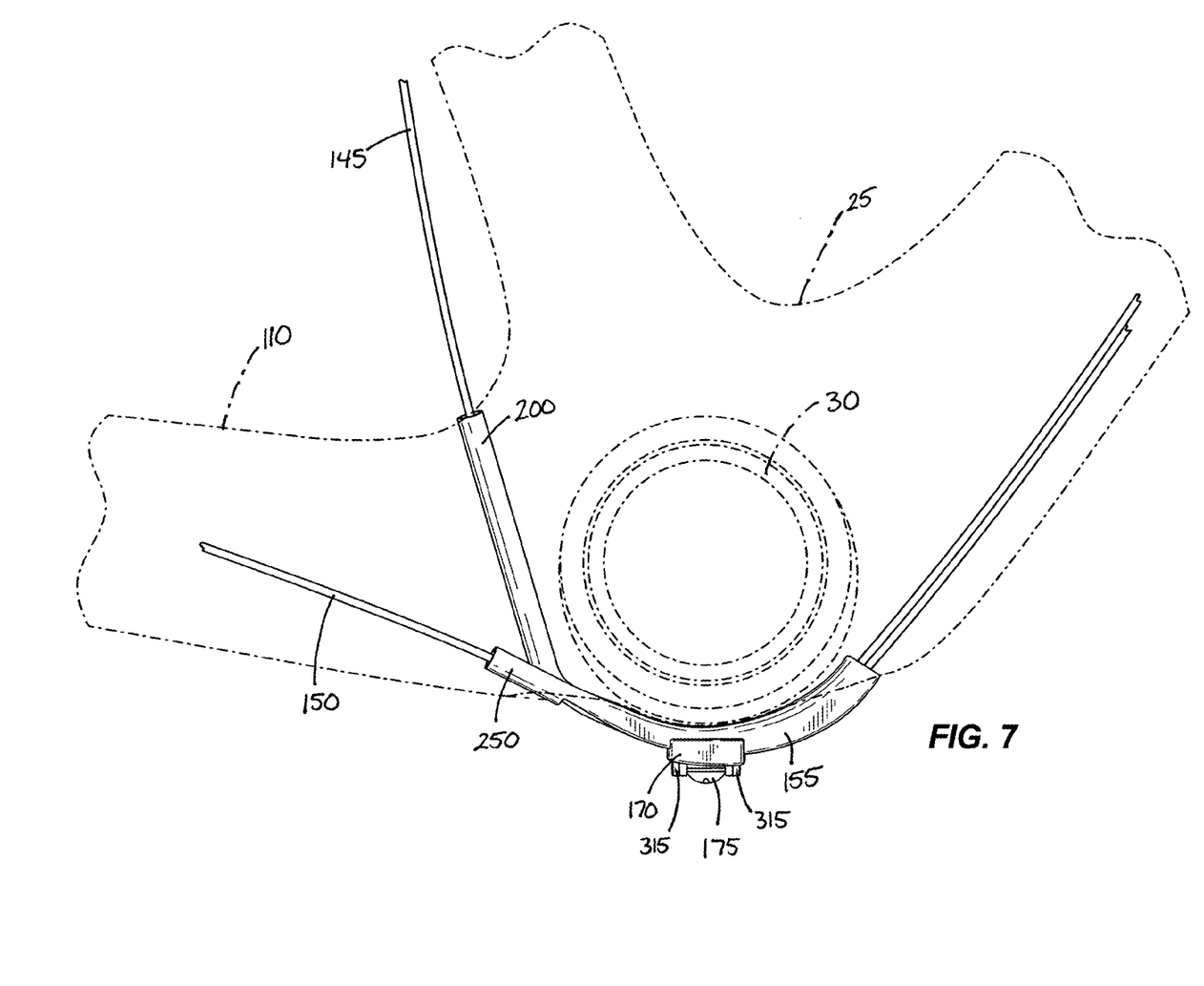
FIG. 7 is a partially exposed side view of the frame and the bottom bracket cable guide of the bicycle of FIG. 1.

Referring to FIGS. 1, 2, and 7, the bicycle 10 also includes a front derailleur 135, a rear derailleur 140, a front derailleur cable 145, and a rear derailleur cable 150. The front derailleur 135 is coupled to the seat tube 90 adjacent the front sprocket assembly 55 and is actuated by moving a front shift mechanism 157 on the right side of the handlebar 120, as is known in the art. The front derailleur 135 is engageable with the chain 50 to shift the chain 50 between the different chain rings 60 of the front sprocket assembly 55. The front derailleur cable 145 extends from the handlebar through the interior of the down tube 80 and exits the down tube 80 through the first cable access area 125 before eventually connecting to the front derailleur 135. In some constructions, the front derailleur cable 145 can extend along the exterior of the down tube 80.

The rear derailleur 140 is coupled to the frame 25 adjacent the rear sprockets 65 near the intersection of the right seat stay 105 and the right chain stay 110 (i.e., adjacent the axle of the rear wheel 20). The rear derailleur 140 is actuated by moving a rear shift mechanism (not shown) on the left side of the handlebar 120, as is known in the art. The rear derailleur is engageable with the chain 50 to shift the chain 50 between different rear sprockets 65. The rear derailleur cable 150 extends from the handlebar through the interior of the down tube 80 and exits the down tube 80 through the first cable access area 125 before eventually connecting to the rear derailleur 140. In some constructions, the rear derailleur cable 150 can extend along the exterior of the down tube 80.

FIGS. 2-8 show that the bicycle 10 includes a cable guide 155 coupled to the frame 25 adjacent (below, as viewed in FIG. 1) the bottom bracket 30 to guide the front and rear derailleur cables 145, 150 from the interior of the down tube 80 and toward the front and rear derailleurs 135, 140, respectively. The cable guide 155 also supports and holds the front derailleur cable 145 and the rear derailleur cable 150 tightly against the frame 25.

The cable guide 155 includes a first guide 160, a second guide 165, and a cover 170 that receives a fastener 175 for attaching and guiding the first guide 160 and the second guide 165 on the frame 25. The first guide 160 is defined by a curved profile (e.g., banana-shaped) that conforms to the curvature of the frame 25 below the bottom bracket 30. The first guide 160 has a first end 180, a second end 185 opposite the first end 180, a first surface 190 that is engageable with the frame 25, and a second surface 195 opposite the first surface 190.

The first guide 160 includes a first cable conduit 200 extending from the second end 185 at a first angle 205 relative to a plane 207 (see FIGS. 5 and 7) through the cable guide 155 (e.g., parallel to the ground) to guide the front derailleur cable 145 toward the front derailleur 135. The first cable conduit 200 is disposed through the chainstay 110 in the frame 25 and is angled so that the front derailleur cable 145 is directed generally upward along the seat tube 90 to the front derailleur 135.

Figure 6:
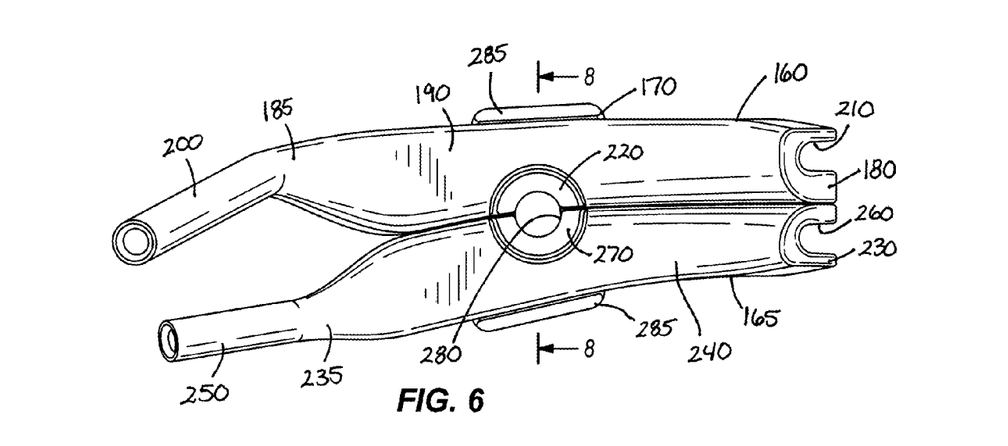
FIG. 6 is a top view of the bottom bracket cable guide.
Figure 8:
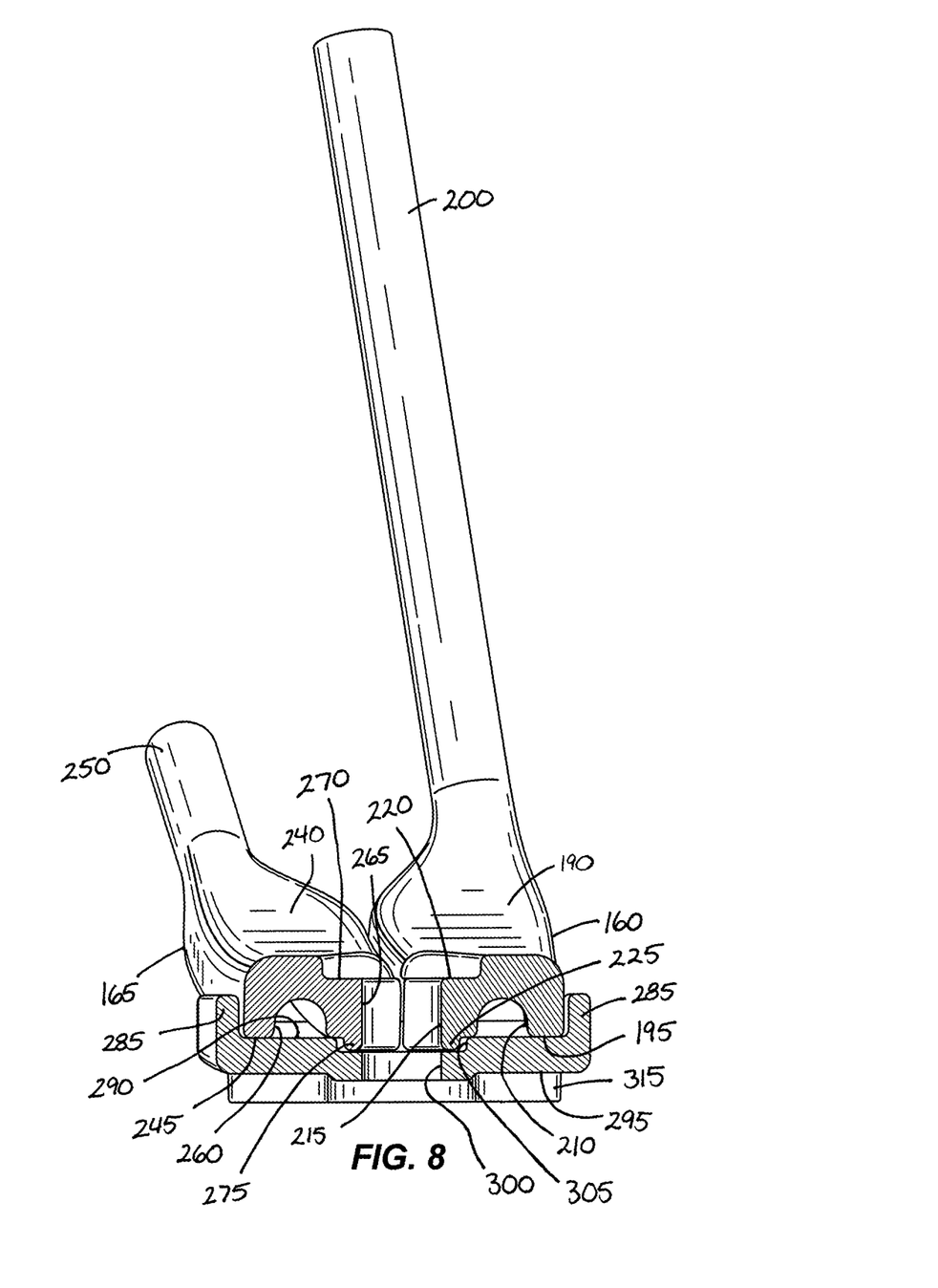
FIG. 8 is a section view of the bottom bracket cable guide taken along line 8-8 in FIG. 6.

A first cable passageway 210 extends from the first end 180 through the curved first guide 160 to the second end 185 and is in communication with the first cable conduit 200 to guide the front derailleur cable 145 through the first guide 160. As illustrated in FIGS. 6 and 8, the first cable passageway 210 is defined by a U-shaped channel that is exposed adjacent the second surface 195. In some constructions, the first cable passageway 210 can be entirely enclosed.

Figure 3:
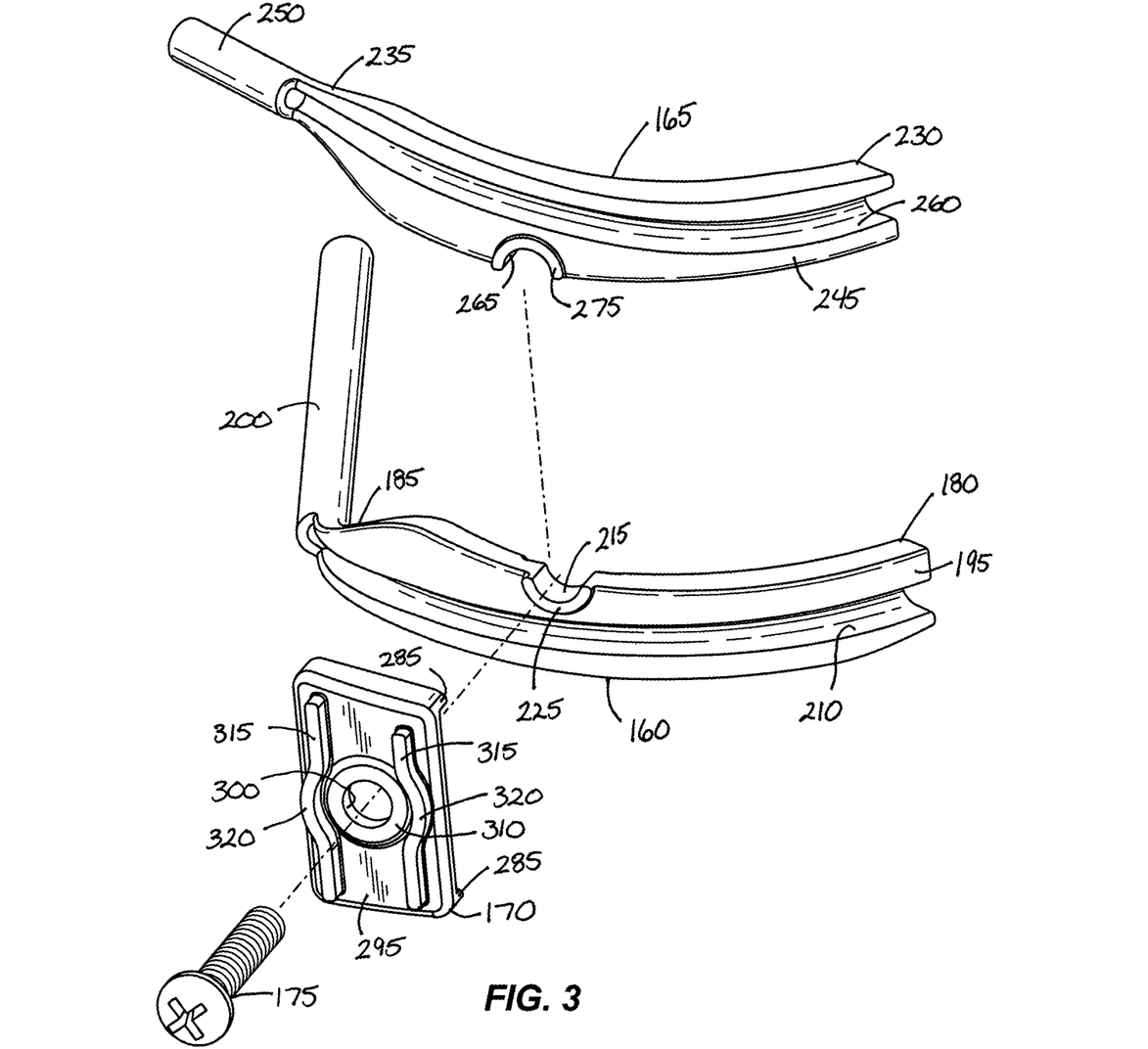
FIG. 3 is an exploded bottom view of the bottom bracket cable guide.

As shown in FIGS. 3, 6, and 8, the first guide 160 also includes a first arcuate recess 215 disposed along an edge of the first guide 160 and extending through the first guide 160 from the first surface 190 to the second surface 195. The first arcuate recess 215 is in communication with an arcuate countersink 220 in the first surface 190, and is at least partially defined by an arcuate rib 225 adjacent and extending outward from the second surface 195.

Figure 4:
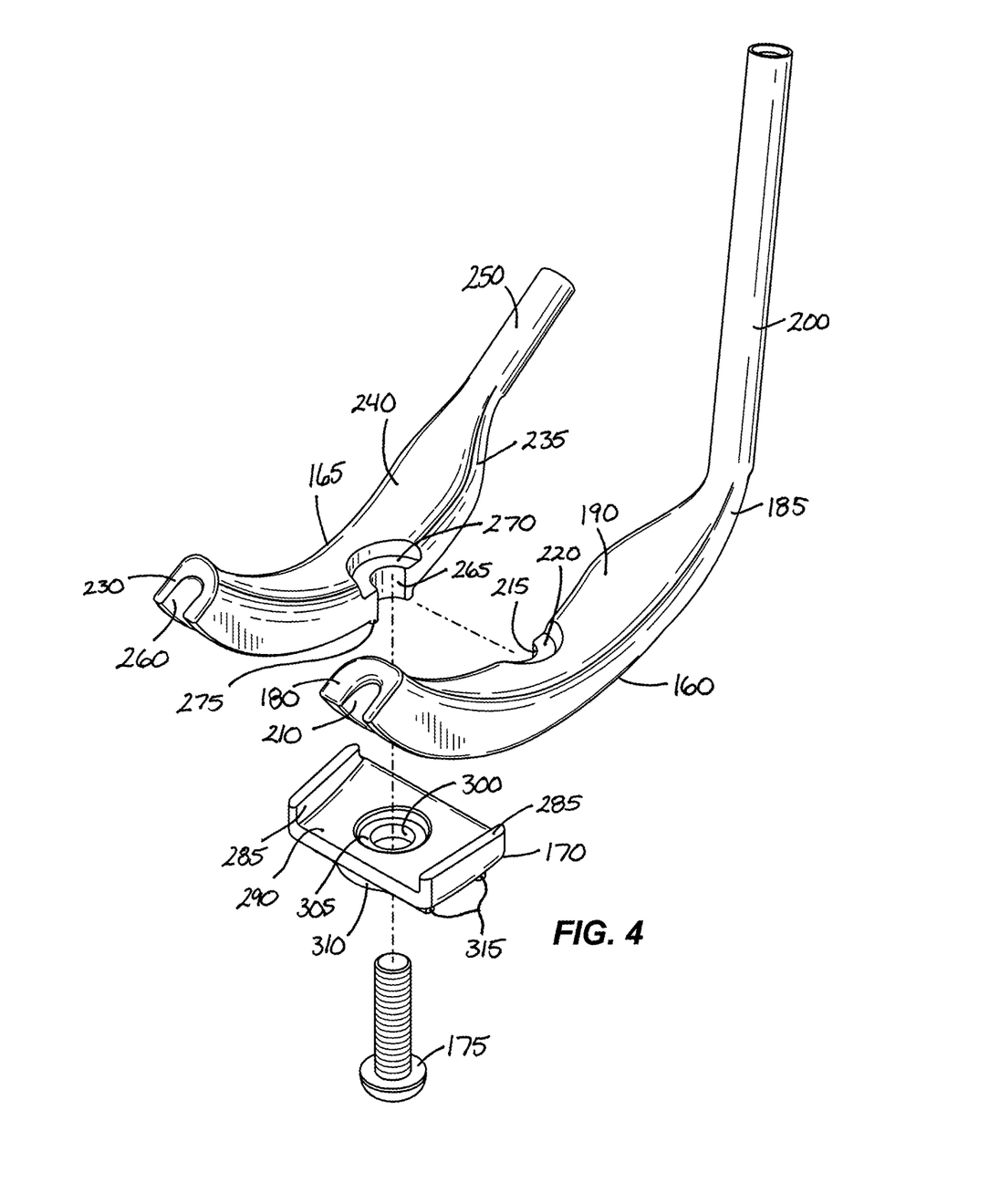
FIG. 4 is an exploded top view of the bottom bracket cable guide.
Figure 5:
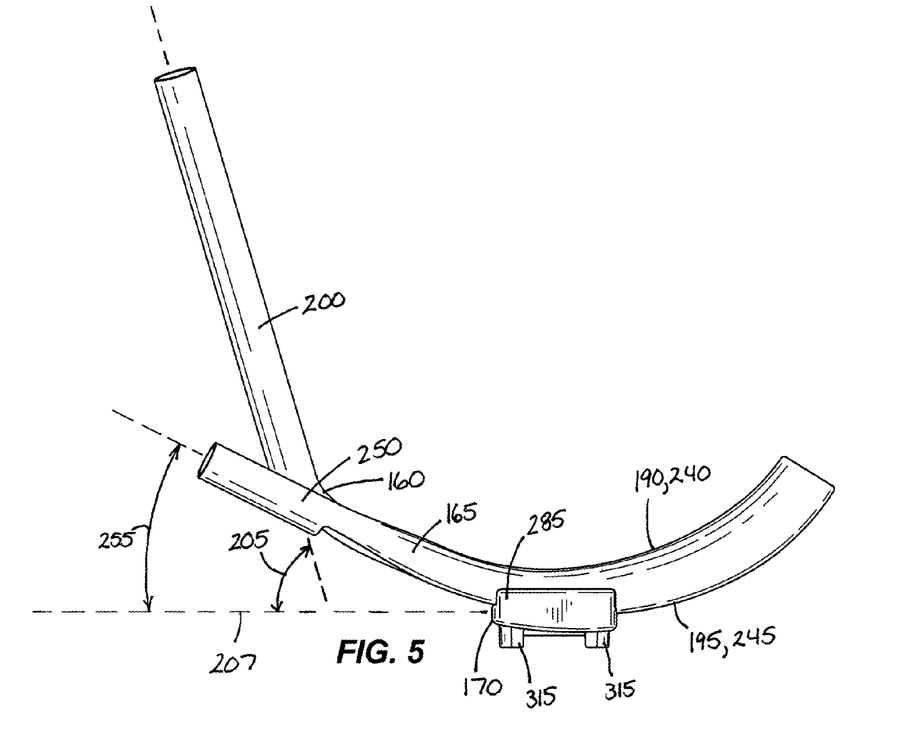
FIG. 5 is a side view of the bottom bracket cable guide.

The second guide 165 is defined by a curved profile (e.g., banana-shaped) that conforms to the curvature of the frame 25 below the bottom bracket 30. The second guide 165 has a first end 230, a second end 235 opposite the first end 230, a first surface 240 that is engageable with the frame 25, and a second surface 245 opposite the first surface 240.

The second guide 165 includes a second cable conduit 250 extending from the second end 235 at a second angle 255 relative to the plane 207 (see FIGS. 5 and 7) through the cable guide 155 to guide the rear derailleur cable 150 toward the rear derailleur 140. The first angle 205 is larger than the second angle 255 such that the first cable conduit 200 is non-parallel or angled relative to the second cable conduit 250. The second cable conduit 250 is disposed in the chain stay 110 and is angled so that the second derailleur cable is directed generally rearward along the chain stay 110 to the rear derailleur 140.

As illustrated in FIG. 7, the rear derailleur cable 150 extends through a hollow inner portion of the chain stay 110, and the first cable conduit 200 is longer than the second cable conduit 250 due in part to the thickness of the frame 25 through which the first cable conduit 200 extends. In other words, the second cable conduit 250 is shorter than the first cable conduit 200 because the conduit 250 need only reach the hollow inner portion of the chain stay 110, which acts as a conduit for the rear derailleur cable 150. In some constructions, the chain stay 110 can include a separate conduit that receives the rear derailleur cable 150 and directs the cable 150 through the chain stay 110 toward the rear derailleur 140. In other constructions, the first cable conduit 250 can extend the length of the chain stay 110.

A second cable passageway 260 extends from the first end 230 through the curved second guide 165 to the second end 235 and is in communication with the second cable conduit 250 to guide the rear derailleur cable 150 through the second guide 165. As illustrated in FIGS. 6 and 8, the second cable passageway 260 is defined by a U-shaped channel that is exposed adjacent the second surface 245. In some constructions, the second cable passageway 260 can entirely enclose the rear derailleur cable 150.

As shown in FIGS. 3, 6, and 8, the second guide 165 also includes a second arcuate recess 265 disposed along an edge of the second guide 165 and extending through the second guide 165 from the first surface 240 to the second surface 245. The second arcuate recess 265 is in communication with an arcuate countersink 270 in the first surface 240, and is at least partially defined by an arcuate rib 275 adjacent and extending outward from the second surface 245.

The first guide 160 and the second guide 165 are separable from each other so that the first guide 160 and the second guide 165 can be separately engaged with and removed from the frame 25 independent of the other guide. When the first guide 160 and the second guide 165 are positioned on the frame 25, the edges of the first guide 160 and the second guide 165 abut or contact each other in an orientation that aligns the first arcuate recess 215 and the second arcuate recess 265 with each other. The first and second arcuate recesses 215, 265 cooperate to define a hole 280 that receives the fastener 175. The first cable passageway 210 in the second cable passageway 260 are separated from each other on either side of the hole 280.

FIGS. 2-8 show that the cover 170 is plate-shaped and includes encapsulating arms or guide members 285, an inner surface 290, an outer surface 295, and a fastener hole 300 extending through the cover 170 between the inner and outer surfaces 290, 295. The guide members 285 are spaced apart from each other on opposite sides of the cover 170. The guide members 285 are engageable with sides of the first and second guides 160, 165 to hold the guides in abutting relationship on the frame 25. As illustrated in FIG. 6, the guide members 285 are non-parallel relative to each other to conform to the angled sides of the first guide 160 and the second guide 165.

With reference to FIGS. 4 and 8, the inner surface 290 extends between the guide members 285 and is engageable with the second surfaces 195, 245 of the first and second guides 160, 165 to partially enclose the first and second cable passageways 210, 260 when the cover 170 is attached to the frame 25. As shown in FIG. 4, the inner surface 290 is curved to accommodate the curvature of the first and second guides 160, 165, and a countersink 305 is defined in the inner surface 290 to receive the arcuate ribs 225, 275 of the first and second guides 160, 165 to limit movement of the guides relative to the frame 25.

With reference to FIGS. 3, 5, 7, 8, the outer surface 295 includes a fastener projection 310 and elongated ribs 315 extending along either side of the fastener hole 300 and the fastener projection 310. The elongated ribs 315 have curved center portions 320 to accommodate a head of the fastener 175. As shown in FIGS. 2 and 7, the elongated ribs 315 function to recess and protect the fastener 175 from debris and impact from foreign objects.

The cable guide 155 is attached to the frame 25 by separately engaging the first guide 160 and the second guide 165 to the frame 25. Due to the separable nature of the cable guide 155, the first guide 160 can be attached to the frame 25 before or after the second guide 165. Generally, the front and rear derailleur cables 145, 150 exiting the down tube 80 are passed through the respective first and second guides 160, 165 after the first and second guides 160, 165 are coupled to the frame 25.

The first guide 160 is coupled to the frame by aligning the first cable conduit 200 with the corresponding access point in the second cable access area 130, and then inserting the first cable conduit 200 into the frame 25 (the forward area of the chain stays 110) through the second cable access area 130. The front derailleur cable 145 exiting the down tube 80 is engaged with the first guide 160 within the first cable passageway 210, and then inserted through the first cable conduit 200. The angled first cable conduit 200 directs the front derailleur cable 145 upward through the frame and along the seat tube 90 to the front derailleur 135. The front derailleur cable 145 is connected to the front derailleur 135 and at least partially tensioned as a result. The tension on the front derailleur cable 145 can be adjusted anytime after the front derailleur cable 145 is connected to the front derailleur 135.

The second guide 165 is coupled to the frame by aligning the second cable conduit 250 with the corresponding access point in the second cable access area 130, and then inserting the second cable conduit 250 into the frame 25 (the forward area of the chain stays 110) through the second cable access area 130. The rear derailleur cable 150 exiting the down tube 80 is engaged with the second guide 165 within the second cable passageway 260, and then inserted through the second cable conduit 250. The angled second cable conduit 250 directs the rear derailleur cable 150 rearward through one of the chain stays 110 (i.e., the chain stay 110 closest to the chain 50) to the rear derailleur 140. The rear derailleur cable 150 exits the chain stay 110 adjacent the axle of the rear wheel 20 to connect with the rear derailleur 140. The rear derailleur cable 150 is connected to the rear derailleur 140 and at least partially tensioned as a result. The tension on the rear derailleur cable 150 can be adjusted anytime after the rear derailleur cable 150 is connected to the rear derailleur 140.

The first guide 160 is held close to or in engagement with the frame 25 due to the tension on the front derailleur cable 145, and the second guide 165 is held close to or in engagement with the frame 25 adjacent the first guide 160 due to the tension on the rear derailleur cable 150. The cover 170 is pressed against the second surfaces 195, 245 of the first and second guides 160, 165 and the first and second guides 160, 165 are encapsulated along their outside edges by the guide members 285. As illustrated, the cover 170 encloses a portion of the first guide 160 and the second guide 165 so that the cable guide 155 is sandwiched between the cover 170 and the frame 25. In other constructions, the cover 170 can enclose substantially all of the first guide 160 and the second guide 165 to further limit contamination of the front and rear derailleur cables 145, 150 by debris and other foreign objects. The fastener 175 is inserted through the hole 300 in the cover 170, through the hole 280 formed by the cable guide 155, and into a threaded hole (not shown) in the frame 25 to attach and hold the cable guide 155 in engagement with the frame 25.

The first cable conduit 200 and the second cable conduit 250 are angled relative to each other to direct the respective front and rear derailleur cables 145, 150 in the general direction of the front and rear derailleurs 135, 140 so that the length of the cables 145, 150 needed to control the front and rear derailleurs 135, 140 is minimized. The cover 170 holds the first guide 160 and the second guide 165 in place on the frame 25, and protects the front and rear derailleur cables 145, 150 and the fastener 175 from contamination.

The cable guide 155 allows the front derailleur cable 145 to be installed and removed separately or independently from the rear derailleur cable 150. In particular, the cable guide 155 is separated into two parts so that the first guide 160 is engageable with and removable from the frame 25 independent of the second guide 165. In this manner, one derailleur cable, either the front derailleur cable 145 or the rear derailleur cable 150, and can be removed and replaced without affecting the other derailleur cable.

The cable guide 155 is separated into two parts (the first guide 160 and the second guide 165) to accommodate the difference between the first angle 205 of the first cable conduit 200 and the second angle 255 of the second cable conduit 250. If the cable guide 155 was formed as a single piece, the angular difference between the first cable conduit 200 and the second cable conduit 250 would make attaching the one-piece cable guide to the frame 25 very difficult, if not impossible. Specifically, a one-piece cable guide would necessitate that the first cable conduit 200 and the second cable conduit be simultaneously inserted into the frame 25 through the second cable access area 130. However, inserting the cable conduits 200, 250 into the frame 25 at the same time would be very difficult because the cable conduit 200, 205 extend at different angles relative to the plane 207. By separating the cable guide 155 into the first guide 160 and the second guide 165, the guides 160, 165 can be consecutively attached to the frame 25 to avoid the difficulty inherent in attaching a one-piece cable guide to the frame 25.

Various features and advantages of the invention are set forth in the following claims.

What is claimed is:

1. A bicycle comprising:
    a frame including a bottom bracket; and
    a cable guide including
        a first guide attached to the frame adjacent the bottom bracket and configured to support a first cable, the first guide including a first cable conduit extending into the frame at a first angle; and a second guide attached to the frame adjacent the bottom bracket and configured to support a second cable, the second guide including a second cable conduit extending into the frame at a second angle different from the first angle.

2. The bicycle of claim 1, wherein the second cable conduit is longer than the first cable conduit.

3. The bicycle of claim 1, wherein the second angle is smaller than the first angle.

4. The bicycle of claim 1, wherein the first guide and the second guide are separably coupled to each other by a fastener.

5. A bicycle frame comprising:
a bottom bracket; and
a cable guide including a first guide configured to support a first cable; and
a second guide configured to support a second cable, the first guide and the
second guide separable from each other and attached to the frame adjacent the bottom bracket by a single fastener, each of the first guide and the second guide defined by a curved profile substantially matching a profile of the frame adjacent the bottom bracket.

6. The bicycle frame of claim 5, wherein the first guide defines a first arcuate recess along an edge of the first guide, and the second guide defines a second arcuate recess along an edge of the second guide, and wherein the first guide and the second guide are positioned to contact each other on the frame such that the first arcuate recess is aligned with the second arcuate recess to form a hole for receiving the fastener.

7. The bicycle frame of claim 6, further comprising a cover coupled to the first guide and the second guide to hold the first guide and the second guide in contact with each other.

8. The bicycle frame of claim 5, wherein the first guide includes a first cable conduit extendable into the frame at a first angle, and wherein the second guide includes a second cable conduit extendable into the frame at a second angle different from the first angle.

9. The bicycle frame of claim 8, wherein the second cable conduit is longer than the first cable conduit.

10. The bicycle frame of claim 8, wherein the second angle is smaller than the first angle.

11. The bicycle frame of claim 5, wherein the first guide is engageable with and removable from the frame independent of the second guide.

12. A cable guide for a bicycle including a frame having a bottom bracket, the cable guide comprising:
a first guide configured to support a first cable and defining a first arcuate recess along an edge of the first guide;
a second guide configured to support a second cable and defining a second arcuate recess along an edge of the second guide, the first guide and the second guide positioned to contact each other on the frame such that the first arcuate recess is aligned and adjoined with the second arcuate recess to form a hole; and
a fastener extending through the hole to attach the first guide and the second guide to the frame adjacent the bottom bracket.

13. The cable guide of claim 12, wherein the first guide includes a first cable conduit extendable into the frame at a first angle, and wherein the second guide includes a second cable conduit extendable into the frame at a second angle different from the first angle.

14. The cable guide of claim 13, wherein the second cable conduit is longer than the first cable conduit.

15. The cable guide of claim 13, wherein the second angle is smaller than the first angle.

* * * * *